Patented Sept. 29, 1953

2,653,938

UNITED STATES PATENT OFFICE 2,653,938

PREPARATION OF FORMOGUANAMINES

Wesley O. Fugate and Leslie C. Lane, Jr., Stamford, Conn., assignors to American Cyanamid Company, New York, N. Y., a corporation of Maine No Drawing. Application September 17, 1948,
Serial No. 49,862

6 Claims. (Cl. 260—249.9)

1

The present invention relates to a method for the preparation of formoguanamines.

It is an object of this invention to prepare formoguanamines by the catalytic hydrogenation of dicyandiamides, inexpensively and from readily available materials.

It is old in the art to hydrogenate dicyandiamide catalytically in aqueous solution under heat and pressure. The result is said to be guanidine and HCN:

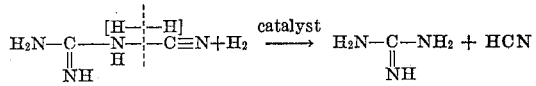

The HCN is said to undergo side reactions forming such substances as ammonia, amines, carbon dioxide, and the like.

In investigating the above-described process, the applicants made the surprising discovery that if a substantially anhydrous reaction medium is used, formoguanamine may be recovered from the reaction mass in good yield. The yield of formoguanamine decreases with the increasing water content of the medium, and none is formed when the medium consists substantially of water.

Applicants' method of making formoguanamine represents a significant advance over prior methods, nearly all of which required a biguanide salt, a triazinyl compound, or other expensive intermediate as one of the reactants.

The process herein described and claimed is a general one, and $N^1$-substituted dicyandiamides may be used in place of dicyandiamide with the formation of the corresponding N-substituted formoguanamines.

An inert liquid, preponderantly non-aqueous, solvent is an essential component of the reaction mixture, and in the specification and claims the term refers to any non-aqueous solvent that dissolves the dicyandiamide chosen without reacting materially with the constituents of the reaction mixture to form undesired compounds. By "preponderantly non-aqueous" is meant that the solvent medium contains less than 25% water.

A wide choice of such solvents is available. Anhydrous ammonia, alcohols, cyclic ethers, and alkoxy ethanols, known as Cellosolves, are eminently suited. Among the alcohols available, the following may be mentioned: methyl, ethyl, n-propyl, isopropyl, the butyls, amyls, capryls, and the like. Cyclic ethers, such as dioxane and the like, can be used. In the Cellosolve group, the methoxy, ethoxy, propoxy, and butoxy ethanols are effective. As before mentioned, limited

2 amounts of water may be present in the solvent, but the yield of formoguanamine is thereby reduced. Substantially no formoguanamine is obtained if the medium contains more than 25% water. For example, methanol containing 5% waer reduces the yield by at least half, and methanol containing 10% water reduces the yield to less than one-third. With 25% water, only traces of formoguanamine are obtained. Substantially anhydrous conditions are therefore preferred for conducting the process.

The following examples illustrate the invention.

Example 1

A nickel catalyst is obtained by precipitating nickel carbonate on a kieselguhr carrier, calcining the mass, then reducing the thus-formed nickel oxide to metallic nickel in a hydrogen atmosphere so that a porous catalyst, consisting of 50% kieselguhr and 50% finely divided nickel, results. Twenty-one grams of dicyandiamide, one hundred grams of methanol, and 2.5 grams of the catalyst were placed in a 300-cc. autoclave and reacted for about one hour under a hydrogen pressure of from 3600–4030 lb./sq. in. at a temperature of 130°–135° C. The autoclave was cooled and the hydrogen vented slowly. The slurry removed from the autoclave was centrifuged and the liquid separated. The solid residue was extracted with boiling water and filtered. On cooling, the filtrate deposited crystals of formoguanamine which, after drying, weighed 9.2 grams. Reworking the mother liquor provided an additional 2.0 grams.

Example 2

In a further experiment hydrogenation was accomplished by using a nickel catalyst made by alloying 40–50 parts of nickel with 50–60 parts of aluminum, followed by dissolving the aluminum with caustic soda and washing the porous mass first with water and then with ethanol. Twenty-one grams of dicyandiamide, one hundred grams of methanol, and ½ teaspoon of the nickel catalyst described were placed in a 300-cc. autoclave, and the autoclave was maintained at about 120° C. under a hydrogen pressure of 900–940 lb./sq. in. for about one hour. The formoguanamine formed was extracted as in Example 1; 9 grams were recovered in the first crystallization.

Example 3

Another suitable catalyst is one made by substituting cobalt for nickel in preparing the catalyst of Example 2. Reacting 21 grams of dicyandiamide with hydrogen under a pressure of 3200–3680 lb./sq. in. at 130° C. in 100 cc. of methanol in a 300-cc. autoclave for one hour in the presence of the cobalt catalyst resulted in a yield of 8.8 grams of formoguanamine.

Example 4

A nickel catalyst prepared according to Adkins and Billica, Journal of American Chemical Society, 70, 695 (1948), permits the use of low temperatures and pressures. Thus, 21 grams of dicyandiamide, 100 cc. of methanol, and 1 teaspoon of the catalyst prepared according to Adkins and Billica were placed in a 300-cc. rocker type autoclave. Hydrogen at 31° C. was introduced into the autoclave to a pressure of 300 lb./sq. in. Hydrogen absorption began at 75° C., and this gas was admitted into the autoclave at intervals over a period of about forty minutes, at the end of which time absorption ceased. Formoguanamine was recovered as in the preceding examples in a yield of 4.2 grams.

Example 5

Although the use of methanol has been described as a solvent in the preceding examples, the process is not limited to methanol or the alcohols. For example, 21 grams of dicyandiamide, 100 cc. of methyl-cellosolve, and ½ teaspoon of the nickel catalyst described in Example 2 were reacted in a 300-cc. autoclave for about one hour at 120° C. under a hydrogen pressure of 2850–3350 lb./sq. in.; 9.2 grams of formoguanamine were obtained in the first filtrate.

Example 6

Cyclic ethers are likewise suitable as solvents. Twenty-one grams of dicyandiamide, one hundred grams of dioxane, and ½ teaspoon of the nickel catalyst of Example 2 were placed in a 300-cc. autoclave at 20° C. and a hydrogen pressure of 1675 lb./sq. in. was forced in. The autoclave was sealed and the temperature was increased to 125° C. and held there for one hour at a hydrogen pressure of 1875–2275 lb./sq. in. The autoclave was then cooled and the reaction mass removed. Extraction as in the preceding examples provided 8.2 grams of formoguanamine in the first filtrate.

Example 7

Solvents are not limited to organic materials. A non-aqueous solvent such as ammonia, which does not react with either dicyandiamide or hydrogen within the temperature and pressure range chosen, is suitable as noted in the following example. Twenty-one grams of dicyandiamide, 65 grams of anhydrous ammonia, and 1 teaspoon of the nickel catalyst of Example 2 were placed in a 300-cc. autoclave at 20° C. and hydrogen was forced in under a pressure of 1875 lb./sq. in. The autoclave was sealed, and the temperature was increased to 147° C. and held there for 2¼ hours at a corresponding hydrogen pressure of 3300–4050 lb./sq. in. Extraction as in the previous examples yielded 8 grams of formoguanamine.

Example 8

Substituted dicyandiamides may be converted by means of this process into substituted formoguanamines. For example, 16 grams of $N^1$-phenyldicyandiamide, 75 cc. of methanol, and ½ teaspoon of the nickel catalyst of Example 2 were placed in a 300-cc. autoclave. The autoclave was heated for about one hour at 127° C. under a hydrogen pressure of 1590–1930 lb./sq. in., cooled, and the reaction mass removed. Extraction with hot absolute alcohol yielded 1.9 grams of N-phenylformoguanamine, M. P. 228°–230° C.

The preparation of formoguanamines according to applicants' invention may be carried out over a wide range of temperatures and pressures, but applicants prefer a temperature of at least 50° C. and a pressure of at least 250 lb./sq. in. The best yields are obtained within the temperature range of 100°–200° C. within a pressure range of 1000–4500 lb./sq. in. Within these higher ranges the reaction is generally complete within fifteen minutes to an hour.

While this invention has been described with reference to specific embodiments, it is to be understood that it is not to be limited thereto but is to be construed broadly and limited only by the scope of the appended claims.

We claim:

1. The process that comprises heating a mixture of a dicyandiamide and hydrogen in an inert preponderantly non-aqueous solvent containing not more than 25% water in the presence of a catalyst of the group consisting of finely divided nickel and finely divided cobalt, at a temperature of at least about 75° C. and at a pressure of at least about 300 lb./sq. in., whereby a formoguanamine is formed, and recovering the said formoguanamine.

2. The process of claim 1 in which the dicyandiamide is unsubstituted and the solvent is a member of the group consisting of alcohols, ethers, and alkoxy ethanols, and formoguanamine is unsubstituted.

3. The process of claim 1 in which the dicyandiamide is $N^1$-phenyldicyandiamide and in which N-phenylformoguanamine is formed and recovered.

4. The process of claim 1 in which the solvent comprises liquid ammonia.

5. The process of claim 1 in which the solvent comprises methanol.

6. The process of claim 1 in which the solvent comprises dioxane.

WESLEY O. FUGATE.
LESLIE C. LANE, JR.

References Cited in the file of this patent

UNITED STATES PATENTS

| Number | Name | Date |
|---|---|---|
| 2,301,503 | Kohler | Nov. 3, 1942 |